(No Model.) 2 Sheets—Sheet 1.
L. K. BUNTAIN.
BIRD TRAP.
No. 507,086. Patented Oct. 17, 1893.
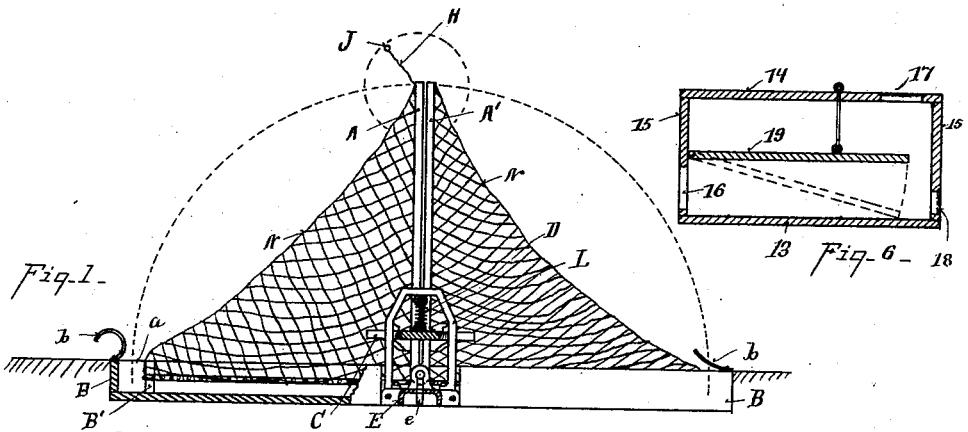
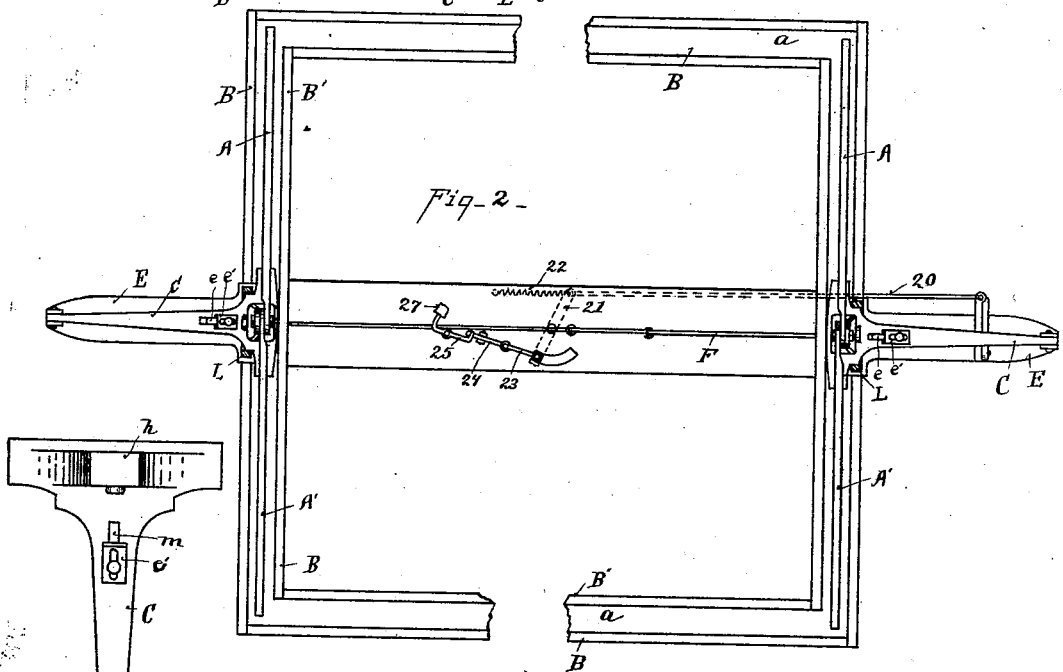
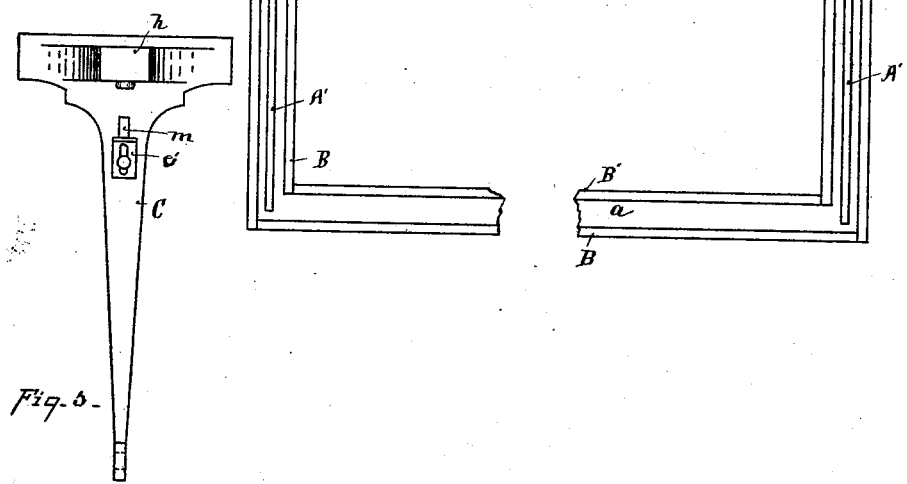
Witnesses
C. W. Miles
T. Simmonds
Inventor
Levi K. Buntain
By his Attorneys Woods Boyd (No Model.) 2 Sheets—Sheet 2.

L. K. BUNTAIN.
BIRD TRAP.

No. 507,086. Patented Oct. 17, 1893.

UNITED STATES PATENT OFFICE.

LEVI K. BUNTAIN, OF DAYTON, OHIO.

BIRD-TRAP.

SPECIFICATION forming part of Letters Patent No. 507,086, dated October 17, 1893.

Application filed February 23, 1892. Serial No. 422,487. (No model.)

*To all whom it may concern:*

Be it known that I, LEVI K. BUNTAIN, a citizen of the United States, and a resident of Dayton, in the county of Montgomery and State of Ohio, have invented certain new and useful Improvements in Bird-Traps, of which the following is a specification.

The object of my invention is to provide a bird trap which can be opened and entirely concealed, if desired, and sprung at a distance by a cord or wire pulling a trigger.

Another object of my invention is to provide a rectangular trap which opens from the center outwardly and is closed by springs so as to inclose the birds or game within the frame.

Another object of my invention is to provide an assemblage trap used in combination with the main trap to gather the birds.

The various features of my invention will be fully set forth in the description of the accompanying drawings making a part of this specification, in which—

Figure 3:
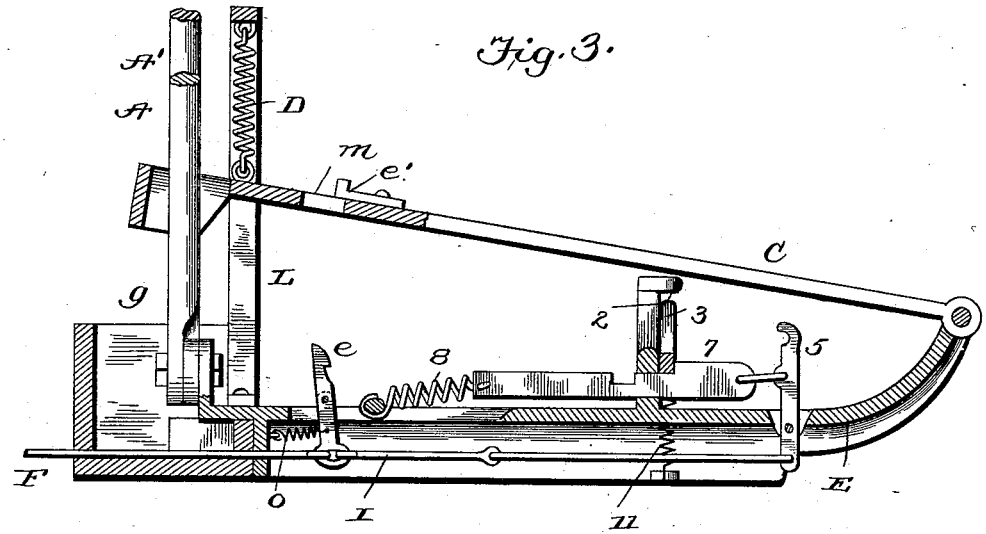
Figure 4:
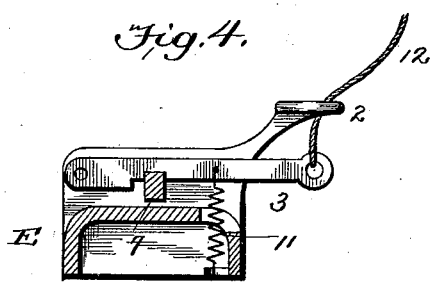

Figure 1 is an end elevation showing the position of the parts when the trap is closed. Fig. 2 is a top plan view showing the position of the parts when the trap is opened with the netting removed. Fig. 3 is a sectional elevation of the springs and setting mechanism. Fig. 4 is a detail view of the tripping device taken at $x, x$, Fig. 3. Fig. 5 is a top plan view of the closing jaw. Fig. 6 is a sectional elevation of the assemblage trap.

B represents a rectangular frame which forms the base for the trap.

$a$ represents a channel formed between the outside frame piece B and the inner face B'; this channel runs all round the trap and serves as a depression into which the netting and the spring arms are placed when the trap is set.

$b$ represents a flap made of canvas or thin leather, and it falls over the channel $a$ so as to conceal the trap from view; it may have a slight covering of earth put upon it, or it may be painted to resemble the ground. The trap is formed of netting N, the lower edges of which are attached to the inner base B' and the inner edges are attached to the arms A A and A' A' respectively. These two arms when shut abut each other and close the opening.

$i$ represents a cord which forms the inner edge of the netting so as to keep it stretched. The arms A A' are pivoted on a common center $l$ attached to the inner end of base piece E.

C represents closing arms placed at either end of the trap, the outer end of which is pivoted to the base E; it is provided with an opening $h$ through which pass the arms A A'.

D represents a tension spring attached to the yoke L at one end and to the arm C at the other end; the tension of the spring being adjusted so that the arm is held normally up in the position shown in Fig. 1 to close the trap.

$m$ represents a second opening through the arm through which passes the latch $e$; when said arm is depressed the latch $e$ engages over the catch $e'$ and holds the arm down until it is released by tripping the latch. Said latch is held in engagement with the catch by means of the spring $o$; to the bottom of said latch is connected a link I.

F represents a connecting rod extending across the trap and connected to the opposite latch, so that both latches may be operated simultaneously. Said link I is hinged to the evener 5, which is pivoted to the base piece E.

7 represents a catch plate which is linked to the evener 5 at one end and hinged to the retractile spring 8 at the opposite end; it passes through the lug 2.

3 represents a trip arm which is held in position by the retractile spring 11. When the evener 5 is pulled outward the spring 8 yields and the notch 10 of catch 7 is engaged by the tripping arm 3 and holds the latch $e$ in the forward position for engaging with the catch plate $e'$ of the arm C, and so hold said arm down in position. When the trip 3 is raised to release its engagement with the notch 10, the coil of spring 8 drawing on the evener 5 draws the latch $e$ backward and releases the latch from contact with the catch $e'$, when the arm C will be quickly raised by the recoil of the spring D. This motion is communicated to the opposite end of the trap by means of the connecting rod F, so that both catches are released by the single movement and the arms A A' at either end are forced together in the position shown in Fig. 1 by the retractile force of the springs D D.

12 represents a cord passing through an opening in the lug 2 and connects with arm 3 which is pulled out any desired distance from the trap to raise the tripping arm 3 and spring the trap.

In order that the top of the trap may be securely closed I provide the following means:

H represents a flap formed of the extension of the netting.

J represents a rod sewed in the edge of the netting; its weight causes the flap to fly over and rest on the opposite side, moving in the path shown in dotted lines Fig. 1.

The auxiliary or assemblage box is as follows: 13 represents the base of the trap; 14 the covering, 15 the ends of the same; 16 represents a door which communicates with a similar door formed in the side of the trap, or any desired part thereof. 17 represents netting at the top, and 18 netting at the end. 19 represents a pivotal partition which is raised when it is desired that the birds enter the box, and lowered to prevent their egress back into the main trap. They may be removed by raising the partition.

The trap is operated in the following manner: The evener 5 is pulled backward by a loop or cord until the catch lever 3 enters the notch 10; this brings the latch $e$ in position to hold the jaws C down which are depressed until the latch $e$ engages with the catch $e'$. Each end is set in the following manner: The arms A are folded back and the net carefully put in the channel $a$ under the flap $b$. The whole may be sunk into the earth a sufficient distance to be out of sight, only exposing the tops of the flaps $b$, which may be painted any desired color, and the trap baited. When the birds or game are within the frame work, the cord 12 is pulled by the attendant, raising the latch lever 3. The recoil of the spring $h$ draws the catch $e$ backward and releases the arms C which spring upward and close centrally over the game.

If it is desired to have the catch sprung by the bird or game, the following mechanism is provided: 20 represents a cord reaching from the trap arm 3 to the interior of the trap; it is attached to a spring lever 21. 22 represents a retractile spring operating said arm 21. 23 represents an eye attached to the lever 21 and engaging with the pivot catch 24 which is hooked to the catch lever 25. Bait is attached at 27 to the free end of lever 25, so that catches 25 and 24 are released allowing the recoil of the spring 22, throwing up the tripping arm and springing the trap.

Having described my invention, what I claim is—

1. A bird trap composed substantially of the base B, the netting N attached to said base and to the pivotal arms A A' at either end, in combination with the closing arms C having their inner ends adapted to slide upon or embrace the arms A A' and cause them to come together, recoil spring D, latch $e$ and tripping mechanism for operating said latch, substantially as specified.

2. A bird trap composed substantially of the base B, the netting N attached to said base and to the pivotal arms A A' at either end, in combination with the closing arms C, having their inner ends adapted to slide upon or embrace said arms A A' and cause them to come together recoil spring D, latch $e$, and the connecting rod F connecting said latches at either end, whereby the two ends of the trap may be simultaneously tripped, substantially as specified.

3. A sparrow trap composed substantially of the base B, the levers A A' centrally pivoted to the base at either end of the trap, the netting N attached to the base and to the pivotal arms, the closing arms C, having their arms adapted to slide upon or embrace said arms A A' and cause them to come together retractile spring D connected to, and arranged between, said closing arms C, and supports above said latter arms the latch $e$, and tripping mechanism, the whole arranged to close the trap by drawing the net from the outer sides to the center, substantially as specified.

4. A trap having the centrally pivoted arms A A', the netting N, latch and spring mechanism for closing said arms A A' and the netting N, which are adapted to open outwardly and fold into the channel $a$ formed in the frame, below the surface substantially as specified.

5. A trap having the centrally pivoted arms A A', netting N and weighted flap H, adapted to lap the opening between said arms when closing with a latch and spring mechanism for closing said arms and netting, substantially as specified.

6. A bird trap having the pivotal arms A A', the netting N adapted to fold into the channel $a$, below the surface and the flap $b$ adapted to cover said channel and conceal the netting from view, substantially as specified.

7. In combination with the arms C C of the trap, the pivotal arms A A', the spring D, sliding spring latch $e$, tripping spring 8, latch 7, tripping arm 3, adapted to engage the upper, notched edge of said latch and be lifted therefrom substantially as specified.

8. In a bird trap, in combination with the closing arm C, hinged to the base E, adapted to engage with arms A A', the setting mechanism composed substantially of the latch $e$, spring 8, sliding latch plate 7, evener 5, connecting rod 4, and tripping arm 3, said evener having direct connection with said rod and link connection with said latch plate 7 substantially as specified.

9. A trap provided with an inner and an outer frame, a pair of spring bows and netting thereon; with a trough formed between the said frames for the reception of the bows and netting when the trap is set, substantially as specified.

In testimony whereof I have hereunto set my hand.

LEVI K. BUNTAIN.

Witnesses:
EDWARD BOYD,
T. SIMMONS.